United States Patent [19]
Kervagoret et al.

[11] Patent Number: 6,145,497
[45] Date of Patent: Nov. 14, 2000

[54] METHOD AND INSTALLATION FOR RECOVERING HEAT IN THE AIR SUPERCHARGING AN ENGINE

[75] Inventors: Alain Kervagoret, Mantes la Ville; Gilles Langlois, Bonnieres sur Seine, both of France

[73] Assignee: Wärtsilä NSD Corporation, Helsinki, Finland

[21] Appl. No.: 09/125,946

[22] PCT Filed: Dec. 23, 1997

[86] PCT No.: PCT/FR97/02401

§ 371 Date: Nov. 23, 1998

§ 102(e) Date: Nov. 23, 1998

[87] PCT Pub. No.: WO98/29645

PCT Pub. Date: Jul. 9, 1998

[30] Foreign Application Priority Data

Dec. 31, 1996 [FR] France .................................. 96 16286

[51] Int. Cl.[7] ...................................................... F02B 33/00
[52] U.S. Cl. .......................................................... 123/563
[58] Field of Search ..................... 60/616, 599; 123/563, 123/41.5

[56] References Cited

U.S. PATENT DOCUMENTS

| | | | |
|---|---|---|---|
| 3,483,854 | 12/1969 | Foran et al. ............................. | 123/563 |
| 3,872,835 | 3/1975 | Deutschmann .......................... | 123/563 |
| 4,120,155 | 10/1978 | Deutschmann .......................... | 60/599 |
| 4,207,848 | 6/1980 | Dinger et al. ............................. | 60/599 |
| 4,517,929 | 5/1985 | Musick et al. ............................ | 60/599 |
| 4,563,983 | 1/1986 | Hayashi et al. .......................... | 123/563 |
| 4,697,551 | 10/1987 | Larsen et al. ............................ | 123/563 |
| 5,546,975 | 8/1996 | Pernet ...................................... | 123/563 |
| 5,868,105 | 2/1999 | Evans ...................................... | 123/41.5 |

FOREIGN PATENT DOCUMENTS 63-94065  4/1988  Japan .
950020  2/1964  United Kingdom .

*Primary Examiner*—Thomas Denion
*Assistant Examiner*—Tu M. Nguyen
*Attorney, Agent, or Firm*—Evenson, McKeown, Edwards & Lenahan, P.L.L.C.

[57] ABSTRACT

A method for recuperating thermal energy in the oxidant air generated by an oxidant air compressor of an internal combustion engine is provided, which consists in taking thermal energy using a heat exchanger in which circulates a heat transferring fluid and which is located in the oxidant air circuit between the compressor and the engine, and transferring the thermal energy recuperated by the fluid to a thermal energy consuming group. The invention is characterized in that it further consists in: detecting the temperature of the surcharging air upstream of the heat exchanger; and when the detected temperature is lower than a first reference temperature, in short circuiting the heat exchanger and heating the heat transferring fluid up to approximately the reference temperature using an auxiliary heating device.

13 Claims, 2 Drawing Sheets

METHOD AND INSTALLATION FOR RECOVERING HEAT IN THE AIR SUPERCHARGING AN ENGINE

BACKGROUND AND SUMMARY OF THE INVENTION

The present invention concerns a method and a power generator installation for recovering thermal energy in the supercharging combustion-supporting air of a reciprocating internal combustion engine by means of a heat exchanger in which a heat-transfer fluid flows and for transferring thermal energy recovered by this fluid to a unit consuming thermal energy.

"Internal combustion engines" are typically:

gas turbines (aircraft engines, generator sets, etc), compression ignition engines (diesel engines, high-pressure gas engines, etc), and controlled ignition engines (petrol engines, low-pressure gas engines, etc).

The latter two categories are sometimes grouped together under the generic name "reciprocating internal combustion engines" which therefore designates internal combustion engines with ignition (compression ignition or controlled ignition).

The invention applies more particularly, although not exclusively, to diesel engines. It may be applicable in the future to petrol engines.

Document FR-A-2.353.715 describes a diesel engine power unit for ships supercharged by at least one turbo-compressor unit the compressor of which is connected by a pipe to a combustion-supporting air intake of the engine and the turbine of which is connected to an engine exhaust gas collecting pipe. A lost heat recovery boiler is disposed at the outlet of the exhaust gas turbine and its function is to heat and to vaporize a working fluid that produces mechanical energy in at least one steam turbine driving a device for increasing the pressure or the flowrate of the air directed to the air inlet of the engine and, where applicable or as an alternative, producing electrical energy.

This unit is characterized by a heat exchanger mounted in the air intake pipe of the engine through which flows a heat-transfer liquid intended to transfer at least some of the heat produced by compressing the supercharging air to a heat exploiting unit mounted in the ship.

A cooler mounted downstream of the heat exploiting unit on the heat-transfer liquid circuit or between the heat exchanger and the engine on the air intake pipe of the latter has the function of reducing the temperature of the heat-transfer liquid to a value enabling the supercharging air to be cooled to a value suitable for its entry into the motor in use.

When a large quantity of recovered heat is required at a high temperature, in the order of 130° C. and above, a heat exchanger of the above kind can be difficult to use in the above manner. The compression ratio of the compressor of a supercharged engine varies with the instantaneous engine load and the air temperature at the exit of the compressor is then too low, in all circumstances and in particular when the engine is no longer operating at a very high load.

Where temperature levels of the above kind are required, it is routine practise to recover the heat in the exhaust gas by means of a boiler similar to that described in the document FR-A-2.353.715 mentioned above. The temperature of the exhaust gases is such that steam is used as the heat-transfer fluid in a boiler of the above kind, in order to minimize the size of the heat exchangers at the level of the heat consuming devices. Although widely used, this technique is difficult to use, the boiler and any control mechanisms being exposed to attack by the exhaust gases (high temperatures, thermal shock, variable loads, corrosion, insulative deposits). Furthermore, the heat-transfer fluid (steam) requires rigorous treatment which the operator is not always in a position to assure.

Consideration has also been given to providing these temperature levels by cooling the hot parts—engine block, cylinders, for example—of an internal combustion engine using a pressurized fluid, for example water, at a high temperature (in the order of 120° C. to 130° C.), so making available a large quantity of heat at a high temperature. Although a system of this kind has advantages, in particular with regard to the dimensions of the heat exchangers, it has a number of disadvantages such as a longer warm-up time, a longer run up to load after a cold start, and a higher temperature of the component parts of the combustion chamber and therefore a higher sensitivity to thermomechanical stresses and to corrosion. Moreover, a system of the above kind requires the use of additional devices to protect personnel. As a result systems of the above kind have until now been reserved to prototype installations and to temperature levels hardly exceeding 130° C.

An aim of the present invention is to overcome these drawbacks.

To this end it proposes a method of recovering thermal energy in the supercharging combustion-supporting air produced by the combustion-supporting air compressor of an internal combustion engine wherein thermal energy is taken by means of a heat exchanger in which a heat-transfer fluid flows and which is situated on the combustion-supporting air circuit between the compressor and the engine and thermal energy recovered by the fluid is transferred to a thermal energy consumer unit, characterized in that it further consists in:

detecting the temperature of the supercharging air upstream of the heat exchanger; and if the temperature detected is less than a first set point temperature, short-circuiting the heat exchanger and heating the heat-transfer fluid approximately to the set point temperature by means of an auxiliary heating device.

In the following, the term "heat-transfer" fluid or liquid is sometimes referred to as a "heat-conducting" fluid or liquid.

Using a process of the above kind makes available some of the heat lost during the operation of an internal combustion engine, at a high temperature, in practise 130° or above, and without the drawbacks associated with recovering heat by means of the prior art devices described hereinabove.

In practise, with modern full load compression ratios, the temperature of the air leaving the compressor can be 200° C. or more. This is why, in a preferred embodiment, the temperature of the heat-conducting fluid is further detected at the exit of the heat exchanger and, if the temperature detected exceeds a second set point temperature, the temperature of the heat-conducting fluid is reduced by passing at least some of it through an exchanger-cooling device in which a cooling fluid flows.

In this way it is possible to maintain the temperature of the heat-conducting fluid within a given temperature range or at a predetermined set point temperature if the second set point temperature is chosen to be equal to or similar to said first set point temperature.

In accordance with one particular aspect of the present invention, the consumer unit is the main cooling circuit of a second internal combustion engine and the second internal combustion engine is heated by transferring thermal energy from said heat-conducting fluid to this main cooling circuit.

This particularly beneficial feature of the present invention makes full use of the heat recovery possibilities when one or more engines operating at high power co-exist with one or more other engines that are stopped, warming up or running at low load.

For implementing the thermal energy recovery process as defined hereinabove, the present invention also proposes a power generating installation in which thermal energy is recovered from the supercharging air of an internal combustion engine, comprising an internal combustion engine, a compressor supplying combustion-supporting air to the engine via a combustion-supporting air supply line, a heat exchanger in which a heat-conducting fluid is circulated by pump means and which is disposed on said supply line, a consumer unit consuming thermal energy recovered by the heat-conducting fluid, communicating with the outlet of the heat exchanger via a hot heat-conducting fluid transfer line and with the inlet of the heat exchanger via a heat-conducting fluid return line, characterized in that it includes first means for detecting the temperature of the supercharging air upstream of the heat exchanger, a short-circuit line connected to the return line and to the transfer line, distributor means for distributing the heat-conducting fluid between the heat exchanger and the short-circuit line and an auxiliary heating device connected to the transfer line, and control means such that, if the temperature detected by the detecting means is less than a set point temperature, the distributor means short-circuit the heat exchanger via the short-circuit line and the auxiliary heating device heats the heat-conducting fluid approximately to the set point temperature.

An installation of the above kind achieves substantial savings compared to the cost of a heat recovery boiler using the exhaust gases (in practise more than 20%) because it has a simpler structure and is clearly more reliable and less bulky than any such boiler.

To be able to regulate the temperature of the heat-conducting fluid in a given temperature range, or to maintain this temperature at a predetermined value, in one preferred embodiment the installation further includes second means for detecting the temperature of the heat-conducting fluid at the outlet of the heat exchanger, a heat-conducting fluid exchanger-cooling device in which a cooling fluid flows and which is disposed on the return line downstream of the distributor means, a branch circuit communicating with the return line so as to short-circuit the exchanger-cooling device connected to the return line upstream of the exchanger-cooling device by second distributor means controlled by the control means so that, if the temperature detected by the second detecting means exceeds a second set point temperature, at least some of the heat conducting fluid is caused to flow through the exchanger-cooling device so that its temperature is reduced.

To simplify as much as possible the structure of the installation of the present invention and consequently to reduce the costs of the installation, the exchanger-cooling device is fluidically connected to the main cooling circuit of the internal combustion engine and/or to a heat exchanger for cooling the supercharging air disposed downstream of the heat exchanger on the combustion-supporting air supply line.

This has the advantage of exploiting the presence of cooling circuits that exist as standard on internal combustion engines.

The energy consuming unit can be an auxiliary heat exchanger adapted to transfer the recovered thermal energy over the transfer line to a heater, such as an lub-oil heater for heating the lub-oil prior to centrifuging or a fuel heater for heating the fuel prior to centrifuging and prior to injection into the engine.

The heat-conducting fluid can be superheated water, for example.

For safety reasons, in one preferred embodiment, the consumer unit is disposed between a hot manifold and a cold manifold providing an expansion tank and fluidically connected to the hot manifold via a discharge line on which is disposed a discharge valve.

Advantageously, the exchanger for cooling the supercharging air has two stages, namely a "high temperature" stage connected to the main cooling circuit of the internal combustion engine and a "low temperature" stage connected to a circuit having a lower exchange temperature.

Said heat exchanger-recovery device, the "high temperature" stage and the "low temperature" stage can therefore be disposed in series on the combustion-supporting air circuit and constitute a compact assembly disposed between the supercharging air compressor and the engine.

This system with three air cooling stages provides an economical way of cooling the combustion-supporting air to the very low temperature required by the engine when a cold source of limited capacity is available, whilst benefiting from the advantages of the invention.

In a variant, the installation includes a second internal combustion engine equipped with a main cooling circuit on which is mounted a heat exchanger adapted to receive thermal energy conveyed by said heat-conveying fluid to heat the second internal combustion engine.

By virtue of the above arrangements it is possible to preheat the second internal combustion engine when stopped or to warm it up using thermal energy recovered from said internal combustion engine that is running.

An installation of the above kind is naturally not limited to the use of two engines.

BRIEF DESCRIPTION OF THE DRAWINGS

Aims, features and advantages of the invention will emerge from the following description given by way of non-limiting example with reference to the accompanying drawings in which.

DETAILED DESCRIPTION OF THE DRAWINGS

Figure 1:
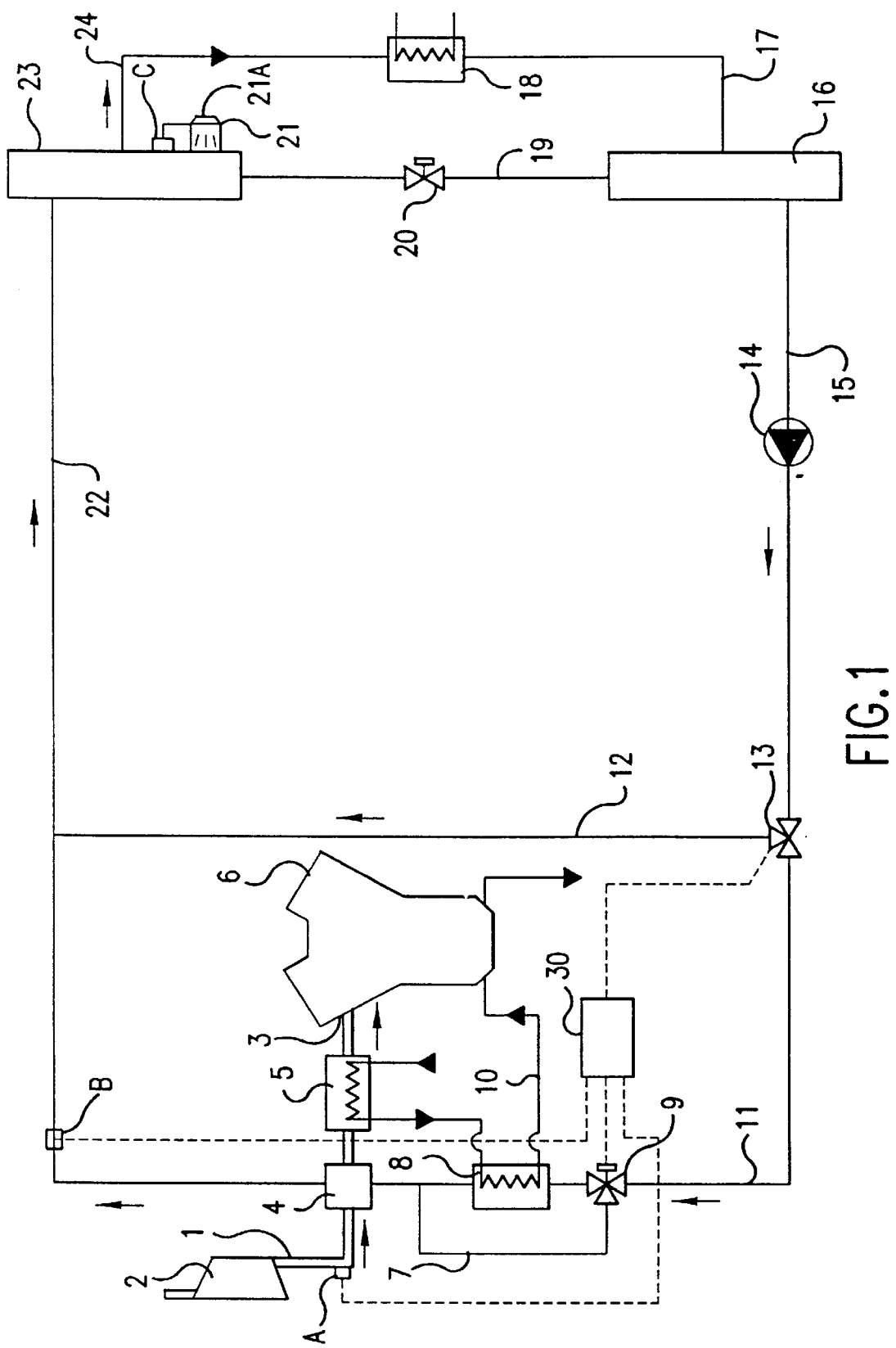
FIG. 1 is a schematic representation of a power generating installation in accordance with the invention including a reciprocating internal combustion engine.

The FIG. 1 installation includes a supercharging combustion-supporting air supply line 1 connecting a supercharger compressor 2 to the combustion-supporting air inlet 3 of a reciprocating internal combustion engine 6, for example a diesel engine. An exchanger-recovery device 4 and a supercharging air cooler 5 downstream of the latter are mounted on the line 1.

A heat-conducting fluid line 11 passes through the exchanger-recovery device 4 and forms part of a heat-conducting fluid circuit including at least one circulating pump 14 and one thermal energy consuming unit 18, here shown schematically as an exchanger:

In practise this circuit includes a high-temperature line 22 for transferring hot heat-conducting fluid to the consumer unit 18 and a low-temperature line 15 for the return flow of the heat-conducting fluid. The heat-conducting fluid line 11 is disposed between the lines 15 and 22 in parallel with a short-circuit line 12. Distributor means 13 are provided on the heat-conducting fluid circuit so that the heat-conducting fluid can be divided at will between the lines 11 and 12. The distributor means preferably comprise a three-way valve at the junction of the short-circuit line 12 and the line 15. Instead, they can comprise a three-way valve at the junction of the line 12 and the line 22, or even a two-way valve fitted to one or other of the lines 11 and 12 to control the flow therein.

The distributor means are controlled by control means 30 connected to a temperature sensor A mounted on the line 1 upstream of the exchanger-recovery device. The distributor means 13 can be a two-way or three-way thermostat valve (see above) in which case the control means 30 are integrated into the distributor means.

An exchanger-cooling device 8 is advantageously fitted to the line 11 between the low-temperature line 15 and the exchanger-recovery device 4 and is preferably (although not necessarily) in series with the supercharging air cooler 5, in other words the same second heat-conducting fluid passes through first one exchanger and then the other. The second heat-conducting fluid advantageously flows through the cooler 5 and then the exchanger-cooling device 8; the circuit 10 of the second heat-conducting fluid can even pass through the engine 6, in other words the circuit 10 can be part of the cooling circuit of the engine 6.

A branch line 7 is connected to the line 11 to short-circuit the exchanger-cooling device 8.

Second distributor means 9 divide the main heat-conducting fluid between the branch line 7 and the exchanger-cooler 8. It is preferably a three-way valve mounted at the "low" junction of the line 7 with the line 11 upstream of the inlet of the exchanger-cooling device 8. As an alternative, it can be a three-way valve at the "high" junction of the line 7 with the line 11 between the exchangers 8 and 4, or even a two-way valve fitted to the line 7 or to the short-circuited part of the line 11 (just upstream or just downstream of the exchanger-cooling device 8).

The second distributor means are controlled by a second temperature sensor B fitted to the heat-conducting fluid circuit downstream of the exchanger-recovery device 4, on the line 11 or on the high-temperature line 22, preferably (but not necessarily) upstream of where the line 12 joins the line 22. The second distributor means are controlled by control means which are here the same as the control means 30; by analogy with what has been stated in connection with the valve 13, the control means for the second distributor means 9 can be integrated with the latter if they are in the form of a thermostat valve. Separate control means for the valve 13 or for the valve 9 may therefore not be identifiable.

The lines 22 and 15 are preferably connected to the consumer unit 18 via a hot manifold 23 and line 24 and a cold manifold 16 and line 17, respectively. This facilitates the parallel fitting of a plurality of groups of consumer devices 18.

A discharge pipe 19 is advantageously disposed between the manifolds 23 and 16 and fitted with a discharge valve 20 so that flowrate fluctuations associated with possible partial use of consumer units can be compensated by closing or isolating some of them.

The hot manifold 23 can be just a pipe connecting the high-temperature line 22 (input) and the consumer line 24 leading to the thermal energy consumer 18 (output)—see the various consumption lines that lead to the various consumer units—and the line 19 when present.

The heat-conducting fluid circuit includes an auxiliary heating device 21 controlled by signals from a third sensor C measuring the temperature of the heat-conducting fluid upstream of the consumer unit or units 18 directly or indirectly. The auxiliary heating device is controlled by control means 21A to regulate the temperature of the heat-conducting fluid.

Here the auxiliary heating device 21 and its sensor C are connected to the hot manifold 23. This device and/or this sensor can instead be connected to the consumption line 24, or even to the discharge line 19, which corresponds to indirect temperature control: when the auxiliary heating device cuts in the temperature of the fluid in the line 19 and therefore, indirectly, upstream of the consumer unit(s), after the fluid flows as far as the line 22, is increased.

It is therefore optional whether the hot manifold 23 is equipped with the auxiliary heating device 21 or not.

In a variant that is not shown the hot manifold 23 can have a hot fluid accumulator function. To this end it can constitute a large storage tank fitted with selectively operable valves and accumulation monitoring devices (in practise monitoring between minimum and maximum thresholds chosen to be compatible with the operation of the consumer units and the installation as a whole). If the accumulation volume is sufficient and if the thermal insulation of the hot manifold is sufficiently good the auxiliary heating device can be used only for back-up, depending on the application.

The auxiliary heating device 21 can comprise electrical heating elements, a fuel oil burner, a heat exchanger or any other technology known in itself provided with a control and regulator unit.

The cold manifold 16 serves as an expansion tank and is preferably provided with accessories (not shown) known in themselves for filling the circuit, degassing the heat-conducting fluid, establishing in operation a pressure relative to atmospheric pressure and assuring the safety of the system. The temperature of this "cold" manifold varies with the consumption, or non-consumption, of the thermal energy introduced via the high-temperature line 22 and/or generated by the auxiliary heating device 21.

Figure 2:
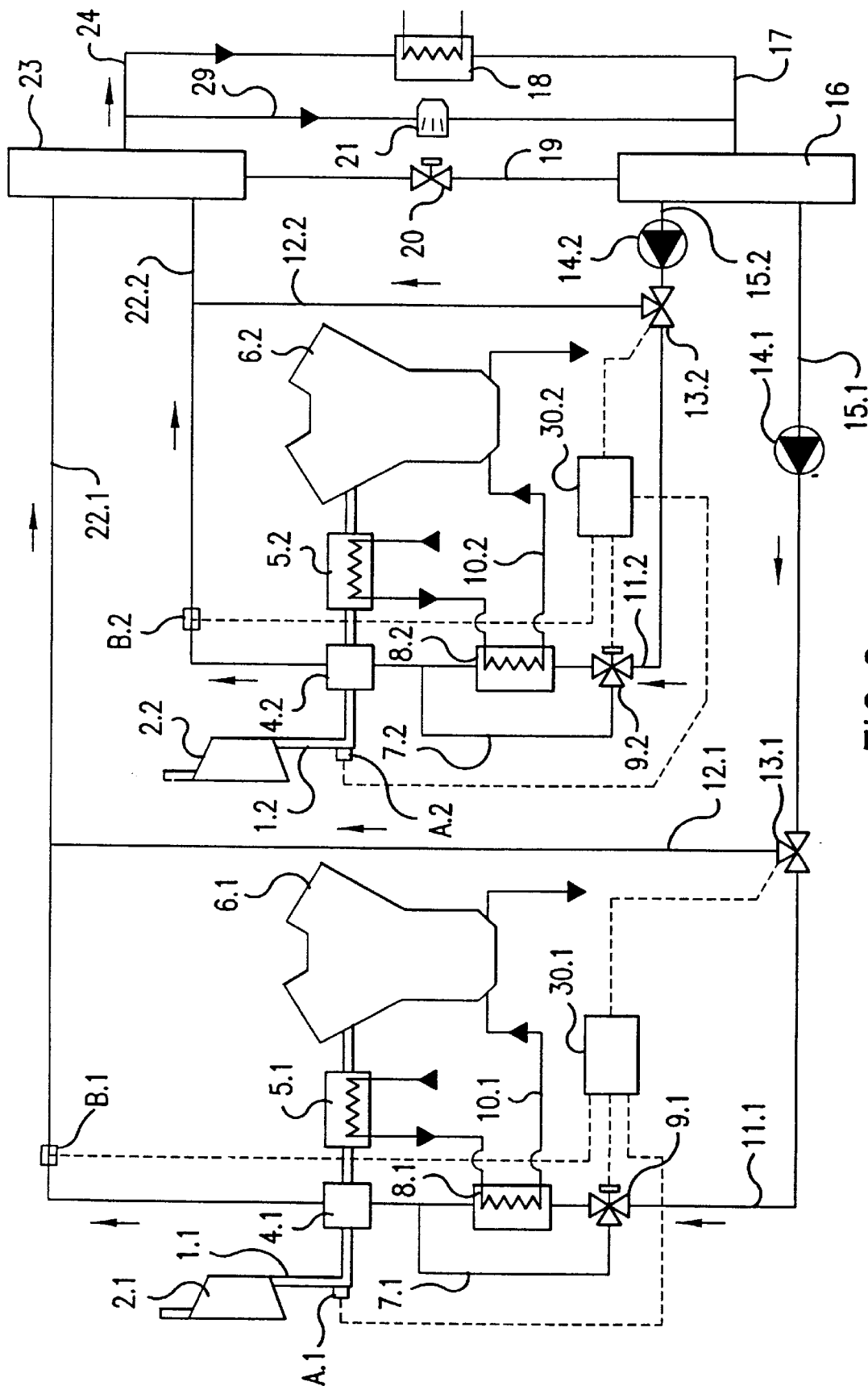
FIG. 2 is a schematic representation of another power generating installation including two reciprocating internal combustion engines.

The FIG. 2 installation differs from that of FIG. 1 in that there are two reciprocating internal combustion engines 6.1 and 6.2 supplied with supercharging combustion-supporting air via lines 1.1 and 1.2 from two compressors 2.1 and 2.2. Each engine is fitted with a system of exchangers and lines similar to the heat recovery part of the FIG. 1 schematic that is to the left of the manifolds 23 and 16. These manifolds are therefore respectively connected to two high-temperature lines 22.1 and 22.2 and to two low-temperature lines 15.1 and 15.2. The above explanation regarding the engine 6 and the associated components applies to each of engines 6.1 and 6.2, with reference symbols derived from those of FIG. 1 by adding ".1" for engine 6.1 and ".2" for engine 6.2.

In a variant that is not shown there is a larger number of engines and exchangers and thermal energy recovery and transfer lines disposed in series between the manifolds 23 and 16.

As in FIG. 1, a discharge line 19 provided with a discharge valve 20 and at least one consumption line 24, 17 provided with a consumer unit 18 are disposed between these manifolds.

In a variant of what is shown in FIG. 1, an additional line 29 is provided between the manifolds in parallel with the consumer units; the auxiliary heating device 21 is mounted on this line 29. The associated temperature sensor can be mounted on this line 29 near the device 21 or on the manifold 23 or on the line 24, etc, as previously.

In operation, the heat-conducting fluid flowing in the line 15 (or 15.1 or 15.2) takes heat from the supercharging combustion-supporting air if the latter is at a sufficiently high temperature, in principle greater than the temperature required upstream of the consumer unit(s) 18. If necessary, the temperature of the heat-conducting fluid at the outlet of the exchanger-recovery device is advantageously reduced by using the valve 9 (or 9.1 or 9.2) to adjust the fraction of the flow of the heat-conducting fluid that is cooled by the exchanger-cooling device 8 (or 8.1 or 8.2). This fraction can be close to 100% (if there is insufficient consumption of the thermal energy transferred by the heat-conducting fluid in the line 22 (or 22.1 or 22.2)) and can drop to 0% in the event of a high demand for thermal energy from the consumer units.

If the temperature of the supercharging air drops too low (for example, is less than or equal to the fluid set point temperature upstream of the consumer units), the valve 13 (13.1 or 13.2) is activated so as to pass at least some of the heat-conducting fluid into the branch line 12 (12.1 or 12.2). This valve is preferably of the "on/off" type in practise. This situation corresponds to the case in which the engine is running at low load and the compression ratio of the compressor is therefore low, for example.

The control thresholds for the valves 13 (or 13.1 or 13.2) and 9 (or 9.1 or 9.2) can be equal (for example 140° C.) or different (for example with a difference of 5% to 10%).

Depending on the temperature measured by the sensor C (which can be combined with sensor B), the auxiliary heating device is activated to maintain the heat-conducting fluid upstream of the consumer unit(s) within a predetermined temperature range (or even at a predetermined temperature).

In practise this predetermined temperature range or this predetermined temperature is a few degrees (for example 1° C. to 5° C.) lower than the threshold of the sensor B to allow for thermal losses along the line 22 (22.1 or 22.2) and in the manifold 23.

The consumer units 18 can be heavy fuel oil heaters, for example, in particular for heating the fuel fed to the engine 6 (6.1 or 6.2). Other applications are possible, of course.

The FIG. 2 installation can take thermal energy from the supercharging air of each engine. However, the parallel arrangement of the various engines 6.1 and 6.2 means that one of them can constitute a consumer unit for the other, if the engines have different operating conditions.

For example, if the engine 6.1 is stopped and the engine 6.2 is operating normally, circulation of the heat-conducting fluid (heated by the supercharging air of the engine 6.2) in the lines 15.1, 11.1 and in the exchanger-cooling unit 8.1 contributes thermal energy to the heat-conducting fluid in the circuit 10.1 and therefore preheats the engine 6.1 and its associated circuits (in this case the exchanger-cooling device 8.1 does not act as a cooling device, but as a consumer unit like unit 18). The roles of the engines 6.1 and 6.2 can naturally be reversed.

It goes without saying that the foregoing description has been given by way of non-limiting example only and that many variants that do not depart from the scope of the invention can be proposed by the skilled person.

What is claimed is:

1. Method of recovering thermal energy in supercharging combustion-supporting air produced by a combustion-supporting air compressor (2, 2.1, 2.2) of an internal combustion engine (6, 6.1, 6.2) wherein thermal energy is taken by means of a heat exchanger (4, 4.1, 4.2) in which a heat-transfer fluid flows and which is situated on a combustion-supporting air circuit between the compressor and the engine and thermal energy (18. 6.1, 6.2) recovered by the fluid is transferred to a thermal energy consumer unit, characterized in that it further consists in:

detecting (A, A.1, A.2) the temperature of the supercharging air upstream of the heat exchanger; and if the temperature detected is less than a first set point temperature, short-circuiting (30, 30.1, 30.2, 13, 13.1, 13.2) the heat exchanger and heating the heat-transfer fluid approximately to the set point temperature by means of an auxiliary heating device (21);

wherein the temperature of the heat-transfer fluid is further detected (B. B.1, B.2) at the exit of the heat exchanger and, if the temperature detected exceeds a second set point temperature, the temperature of the heat-transfer fluid is reduced by passing at least some of it (30, 30.1, 30.2, 9, 9.1, 9.2) through an exchanger-cooling device (8, 8.1, 8.2) in which a cooling fluid flows; and further wherein the second set point temperature is at least approximately equal to said first set point temperature.

2. Method according to claim 1 characterized in that the consumer unit is a main cooling circuit of a second internal combustion engine and in that the second internal combustion engine is heated by transferring thermal energy from said heat-transfer fluid to this main cooling circuit.

3. Method according to claim 1 characterized in that the exchanger-cooling device is fluidically connected to the main cooling circuit of the internal combustion engine.

4. Method according to claim 1 characterized in that the exchanger-cooling device is fluidically connected to an exchanger for cooling the supercharging air in which a cooling fluid flows and which is disposed downstream of said heat exchanger on the combustion-supporting air circuit.

5. Method according to claim 1 characterized in that the exchanger-cooling device for cooling the heat-transfer fluid, an exchanger for cooling the supercharging air and the main cooling circuit of the internal combustion engine are fluidically connected.

6. Power generating installation in which thermal energy is recovered from supercharging air of an internal combustion engine comprising an internal combustion engine (6; 6.1; 6.2), a compressor (2; 2.1; 2.2) supplying combustion-supporting air to the engine via a combustion-supporting air supply line (1, 1.1, 1.2), a heat exchanger (4; 4.1; 4.2) in which a heat-transfer fluid is circulated by pump means (14, 14.1, 14.2) and which is disposed on said supply line, a consumer unit (18; 10.1, 6.1, 10.2, 6.2) consuming thermal energy recovered by the heat-transfer fluid, communicating with the outlet of the heat exchanger via a hot heat-transfer fluid transfer line (22, 24; 22.1; 22.2) and with the inlet of the heat exchanger via a heat-transfer fluid return line (11, 15, 17; 11.1, 15.1, 11.2, 15.2), characterized in that it includes first means (A, A.1, A.2) for detecting the temperature of the supercharging air upstream of the heat exchanger, a short-circuit line (12; 12.1; 12.2) connected to the return line and to the transfer line, distributor means (13, 13.1, 13.2) for distributing the heat-transfer fluid between the heat exchanger (4, 4.1, 4.2) and the short-circuit line and an auxiliary heating device (21) connected to the transfer line, and control means (30, 30.1, 30.2) such that, if the temperature detected by the detecting means is less than a set point temperature the distributor means short-circuit the heat exchanger via the short-circuit line and the auxiliary heating device heats the heat-transfer fluid approximately to the set point temperature;

further comprising second means (B. B.1, B.2) for detecting the temperature of the heat-transfer fluid at the outlet of the heat exchanger, a heat-transfer fluid exchanger-cooling device in which a cooling fluid flows and which is disposed on the return line downstream of the distributor means, a branch circuit (7; 7.1, 7.2) communicating with the return line so as to short-circuit the exchanger-cooling device connected to the return line upstream of the exchanger-cooling device by second distributor means (9; 9.1, 9.2) controlled by the control means so that, if the temperature detected by the second detecting means exceeds a second set point temperature, at least some of the heat transfer fluid is caused to flow through the exchanger-cooling device so that its temperature is reduced; and wherein said second set point temperature is at least approximately equal to said first set point temperature.

7. Installation according to claim 6 characterized in that the consumer unit is an auxiliary heat exchanger (18) adapted to transfer thermal energy recovered over the transfer line to a heater.

8. Installation according to claim 6 characterized in that the consumer unit is disposed between a hot manifold (23) and a cold manifold (16) providing an expansion tank and fluidically connected to the hot manifold via a discharge line (19) on which is disposed a discharge valve (20).

9. Installation according to claim 8 characterized in that the auxiliary heating device is connected to the hot manifold (23) in series with the consumer unit (or in parallel with this unit) by being fluidically connected to the transfer line downstream of the hot manifold and to the return line upstream of the cold manifold.

10. Installation according to claim 6 characterized in that the installation includes a second internal combustion engine (6.1) equipped with a main cooling circuit on which is mounted a heat exchanger (8.1) adapted to receive thermal energy conveyed by said heat-transfer fluid to heat the second internal combustion engine.

11. Installation according to claim 6 characterized in that the exchanger-cooling device is fluidically connected to the main cooling circuit of the internal combustion engine.

12. Installation according to claim 6 characterized in that the exchanger-cooling device is fluidically connected to an exchanger for cooling the supercharging air disposed downstream of the heat exchanger on the combustion-supporting air supply line.

13. Installation according to claim 11 characterized in that the exchanger-cooling device, the main cooling circuit and an exchanger for cooling the supercharging air are fluidically connected.

* * * * *